US011589018B2

(12) United States Patent
Tsai et al.

(10) Patent No.: US 11,589,018 B2
(45) Date of Patent: Feb. 21, 2023

(54) ROTATION-TYPE OPTICAL MODULE AND PROJECTION APPARATUS (71) Applicant: Coretronic Corporation, Hsin-Chu (TW)

(72) Inventors: Chia-Lun Tsai, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/164,785

(22) Filed: Feb. 1, 2021

(65) Prior Publication Data
US 2021/0250560 A1 Aug. 12, 2021

(30) Foreign Application Priority Data

Feb. 6, 2020 (CN) .......................... 202010081212.2

(51) Int. Cl.
*H04N 9/31* (2006.01)
*G03B 21/20* (2006.01)
*G02B 26/00* (2006.01)

(52) U.S. Cl.
CPC ......... *H04N 9/3111* (2013.01); *G02B 26/008* (2013.01); *G03B 21/204* (2013.01); *H04N 9/3158* (2013.01)

(58) Field of Classification Search
CPC ............ G03B 21/204; G03B 21/00–64; G02B 26/008; G02B 26/00–129; H04N 9/00–898
See application file for complete search history.

(56) References Cited

U.S. PATENT DOCUMENTS

2006/0237357 A1* 10/2006 Jia ........................ G02B 26/008
  210/330
2010/0245776 A1* 9/2010 Yamamoto ........... G03B 21/204
  353/38
(Continued)

FOREIGN PATENT DOCUMENTS

CN 104216208 12/2014
CN 106681092 5/2017
(Continued)

OTHER PUBLICATIONS

"Office Action of China Counterpart Application", dated Aug. 29, 2022, p. 1-p. 10.

*Primary Examiner* — Bao-Luan Q Le
*Assistant Examiner* — Christopher A Lamb, II
(74) *Attorney, Agent, or Firm* — JCIPRNET (57) ABSTRACT A rotation-type optical module includes a driving element, a turntable, an optical material, a balancing ring, and a first weight substance. The driving element includes a body and a rotating shaft body. The turntable is sleeved on the rotating shaft body and includes a first surface and a second surface. The optical material is disposed on the first surface of the turntable. The balancing ring is disposed between the driving element and the turntable and includes a third surface and a fourth surface, and the third surface and the second surface face each other. The balancing ring includes an outer retaining wall and at least one inner retaining wall which protrude from the fourth surface, and the first weight substance abuts between the outer retaining wall and the at least one inner retaining wall. A projection apparatus including the foregoing rotation-type optical module is further provided.

18 Claims, 6 Drawing Sheets (56) References Cited

U.S. PATENT DOCUMENTS

2018/0059403 A1* 3/2018 Takamatsu ............ H04N 9/3161
2018/0299756 A1* 10/2018 Maeda ................. H04N 9/3144

FOREIGN PATENT DOCUMENTS

| CN | 211786360 | 10/2020 |
| TW | 487178 | 5/2002 |
| TW | I579634 | 4/2017 |

* cited by examiner

ROTATION-TYPE OPTICAL MODULE AND PROJECTION APPARATUS

CROSS-REFERENCE TO RELATED APPLICATION

This application claims the priority benefit of China application serial no. 202010081212.2, filed on Feb. 6, 2020. The entirety of the above-mentioned patent application is hereby incorporated by reference herein and made a part of this specification.

BACKGROUND

Technical Field

The disclosure relates to an optical module and an electronic device, and in particular, to a rotation-type optical module and a projection apparatus.

Description of Related Art

A projection apparatus is a display apparatus for generating a large-sized picture. With the evolution and innovation of science and technology, the projection apparatus has been continuously improved. An imaging principle of the projection apparatus is to convert an illumination beam generated by an illumination system into an image beam via a light valve, and then project the image beam onto a projection target object (for example, a screen or a wall surface) through a projection lens, to form a projection picture.

In the illumination system, a current practice that is more cost-effective to generate red-green light is using a blue laser diode to emit an excitation beam to a fluorescent color wheel, and using the excitation beam to excite the phosphor of the fluorescent color wheel to generate yellow-green light. Then, the required red or green light is filtered out by a filter element (a color wheel) for use.

In the known fluorescent color wheel, a metal ring is required to increase the weight of the fluorescent color wheel, thereby modifying a center of mass of the fluorescent color wheel. However, the current metal ring is located on one side (that is, a side facing the light) of a turntable that is relatively far from a motor. Therefore, when balancing is completed, the center of mass of a rotor certainly will fall in the turntable. In this way, the axial force may be larger, and consequently, an element body may be vibrated greatly. In addition, the existing metal ring includes only one axial turning retaining wall, and therefore, a curing glue and a copper sheet can only be added at an outer diameter near the retaining wall. Besides, the outer diameter of the metal ring is small, and the copper sheet can only be disposed on an inner ring part with respect to the turntable. It takes more time to perform dynamic balancing, and the copper sheet of the same mass is less effective. In addition, since a bonding area between a known optical element such as reflective glass or transmissive glass and the metal ring is small, structural strength is not good. During rotation at a high speed, if there is an external force vibration at the natural frequency of the structure, resonance will occur, which may lead to serious deformation of the turntable and finally cause large vibration and noise of the body.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a rotation-type optical module and a projection apparatus, which may effectively lower a center-of-mass position of the rotation-type optical module, avoid deformation of a turntable as a result of an unstable structure, and reduce the vibration phenomenon generated during rotation.

Other objectives and advantages of the invention may be further known from technical features disclosed in the invention.

In order to achieve one or some or all of the foregoing objectives or other objectives, the invention provides a rotation-type optical module, the rotation-type optical module including a driving element, a turntable, an optical material, a balancing ring, and a first weight substance. The driving element includes a body and a rotating shaft body extending from the body. The turntable is sleeved on the rotating shaft body and includes a first surface and a second surface opposite to each other. The optical material is disposed on the first surface of the turntable. The balancing ring is disposed between the driving element and the turntable and includes a third surface and a fourth surface opposite to each other, and the third surface and the second surface face each other. The first weight substance is disposed on the fourth surface of the balancing ring. The balancing ring includes an outer retaining wall and at least one inner retaining wall which protrude from the fourth surface, and the first weight substance abuts between the outer retaining wall and the at least one inner retaining wall.

In order to achieve one or some or all of the foregoing objectives or other objectives, the invention further provides a projection apparatus including an illumination system, at least one light valve, and a projection lens. The illumination system is configured to provide an illumination beam. The illumination system includes a rotation-type optical module. The rotation-type optical module includes a driving element, a turntable, optical material, a balancing ring, and a first weight substance. The driving element includes a body and a rotating shaft body extending from the body. The turntable is sleeved on the rotating shaft body and includes a first surface and a second surface opposite to each other. The optical material is disposed on the first surface of the turntable. The balancing ring is disposed between the driving element and the turntable and includes a third surface and a fourth surface opposite to each other, and the third surface and the second surface face each other. The first weight substance is disposed on the fourth surface of the balancing ring. The at least one light valve is disposed on a transmission path of the illumination beam, and is configured to convert the illumination beam into an image beam. The projection lens is disposed on a transmission path of the image beam, and is configured to project the image beam out of the projection apparatus. The balancing ring includes an outer retaining wall and at least one inner retaining wall which protrude from the fourth surface, and the first weight substance abuts between the outer retaining wall and the at least one inner retaining wall.

Based on the foregoing, the embodiments of the invention include at least one of the following advantages or effects. In the rotation-type optical module and the projection apparatus of the invention, the balancing ring of the rotation-type optical module is disposed below the turntable, which may avoid interference with the optical effect of the optical material above the turntable. In addition, since the balancing ring is disposed below the turntable, the operability of adjusting the load may be improved. Furthermore, the balancing ring is disposed below the turntable to avoid an excessively high overall center-of-mass position of the rotation-type optical module, thereby improving the stability of the rotation-type optical module during rotation. In other words, the foregoing configuration may effectively lower a center-of-mass position of the rotation-type optical module to avoid deformation of the turntable as a result of an unstable structure, and reduce the vibration phenomenon generated during rotation.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
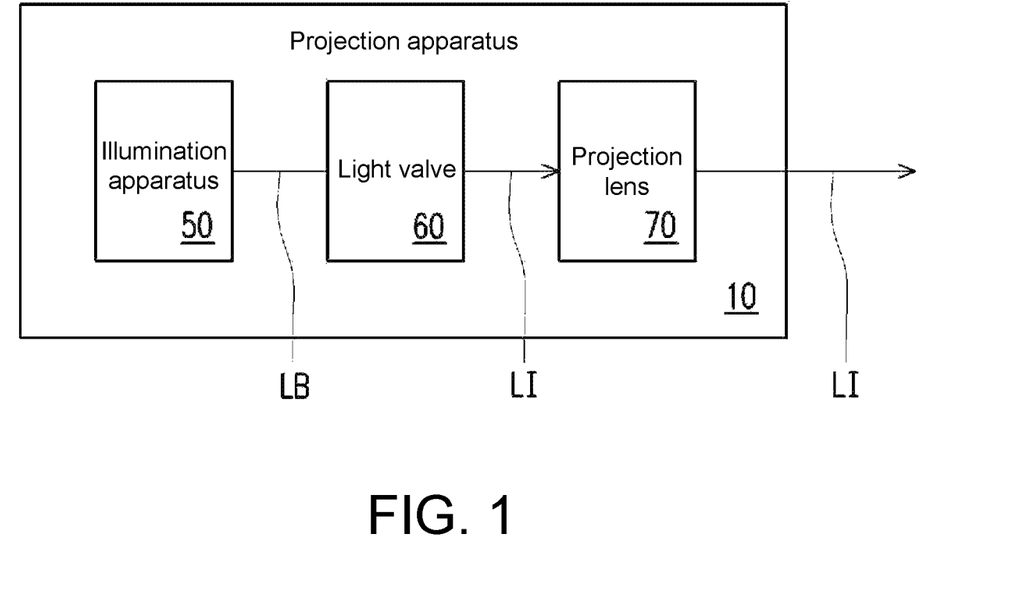
FIG. 1 is a schematic diagram of a projection apparatus according to an embodiment of the invention.

FIG. 1 is a schematic diagram of a projection apparatus according to an embodiment of the invention. Referring to FIG. 1, the present embodiment provides a projection apparatus 10 including an illumination system 50, at least one light valve 60, and a projection lens 70. The illumination system 50 is configured to provide an illumination beam LB. The at least one light valve 60 is disposed on a transmission path of the illumination beam LB, and is configured to convert the illumination beam LB into an image beam LI. The projection lens 70 is disposed on a transmission path of the image beam LI, and is configured to project the image beam LI out of the projection apparatus 10 to a projection target (not shown), for example, a screen or a wall surface.

The illumination system 50 is configured to provide an illumination beam LB. For example, in the present embodiment, the illumination system 50 is composed of, for example, a plurality of light-emitting elements, a wavelength conversion element, a light homogenizing element, a filtering element, and a plurality of light splitting and combining elements, to provide light beams of different wavelengths as sources of image beams. However, the invention does not limit a category or a form of the illumination system 50 in the projection apparatus 10, and for a detailed structure and implementation thereof, adequate instructions, advices, and implementation descriptions may be obtained from subsequent paragraphs and general knowledge in the art.

The light valve 60 is, for example, a reflective light modulator such as a liquid crystal on silicon panel (an LCoS panel) or a digital micro-mirror device (DMD). In some embodiments, the light valve 60 may also be a penetrated optical modulator such as a transparent liquid crystal panel, an electro-optical modulator, a magneto-optic modulator, and an acousto-optic modulator (AOM). The invention does not limit the form and category of the light valve 60. For detailed steps and implementations of converting the illumination beam LB into the image beam LI by the light valve 60, adequate instructions, advices, and implementation descriptions may be obtained from general knowledge in the art, and the descriptions thereof are omitted herein. In the present embodiment, there is only one light valve 60, for example, the projection apparatus 10 with a single digital micro-mirror element is used, but in other embodiments, there may be a plurality of light valves, and the invention is not limited thereto.

The projection lens 70 includes, for example, a combination of one or more optical dioptric lenses, for example, includes various combinations of non-planar lenses such as a biconcave lens, a biconvex lens, a meniscus lens, a convex-concave lens, a plano-convex lens, and a plano-concave lens. In one embodiment, the projection lens 70 may further include a flat optical lens, which projects the image beam LI from the light valve 60 to the projection target in a reflective manner. A form and a category of the projection lens 70 are not limited in the invention.

Figure 2A:
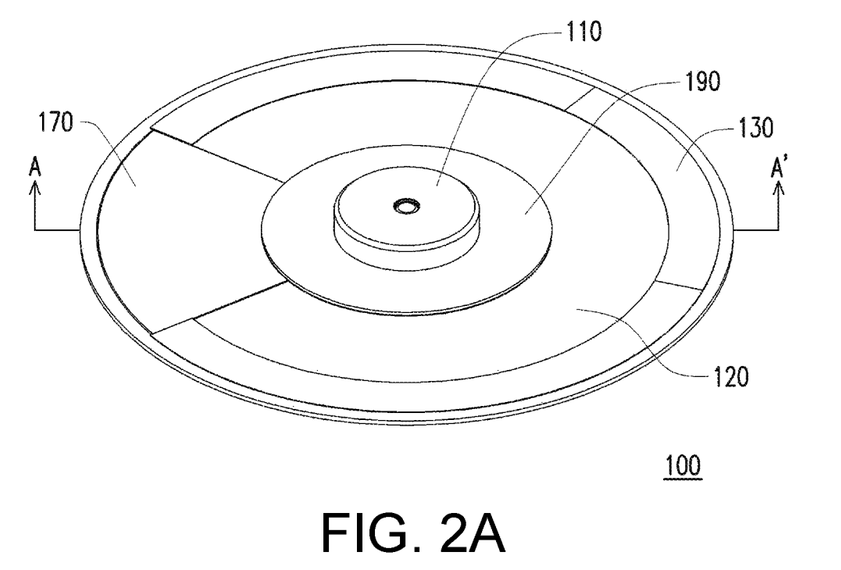
FIG. 2A and FIG. 2B are each a schematic three-dimensional view of different perspectives of a rotation-type optical module according to an embodiment of the invention.
Figure 2B:
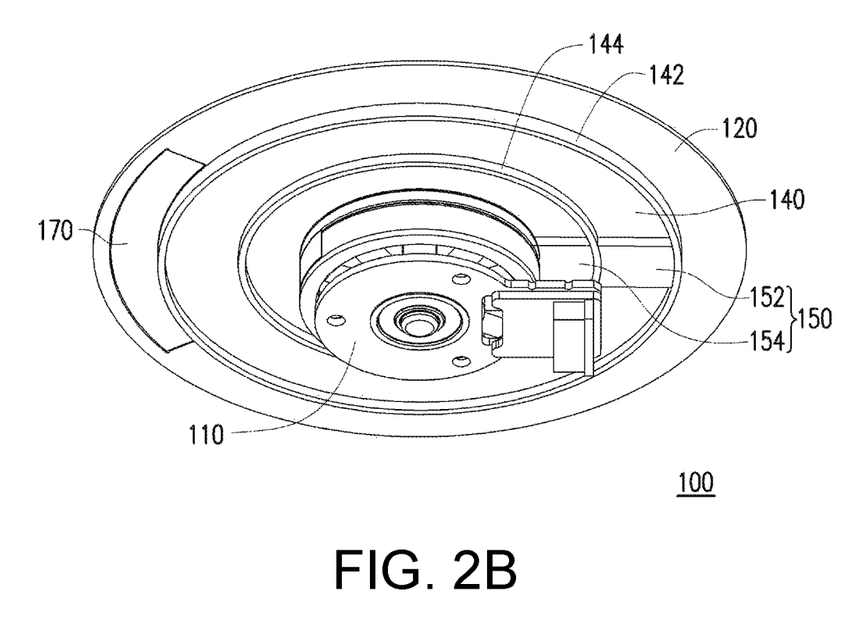
Figure 3A:
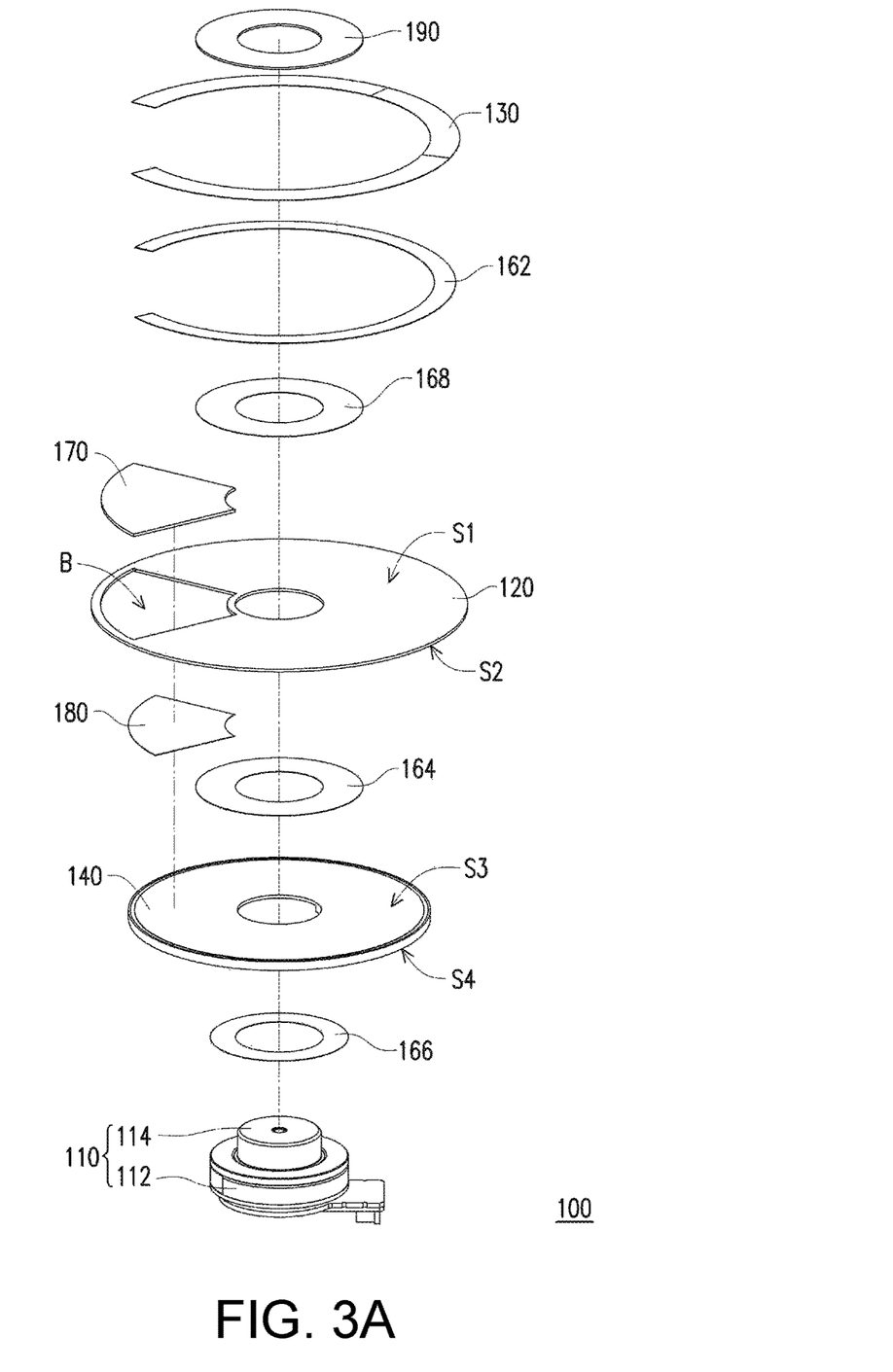
FIG. 3A and FIG. 3B are each a schematic three-dimensional exploded view of a rotation-type optical module of FIG. 2A and FIG. 2B.
Figure 3B:
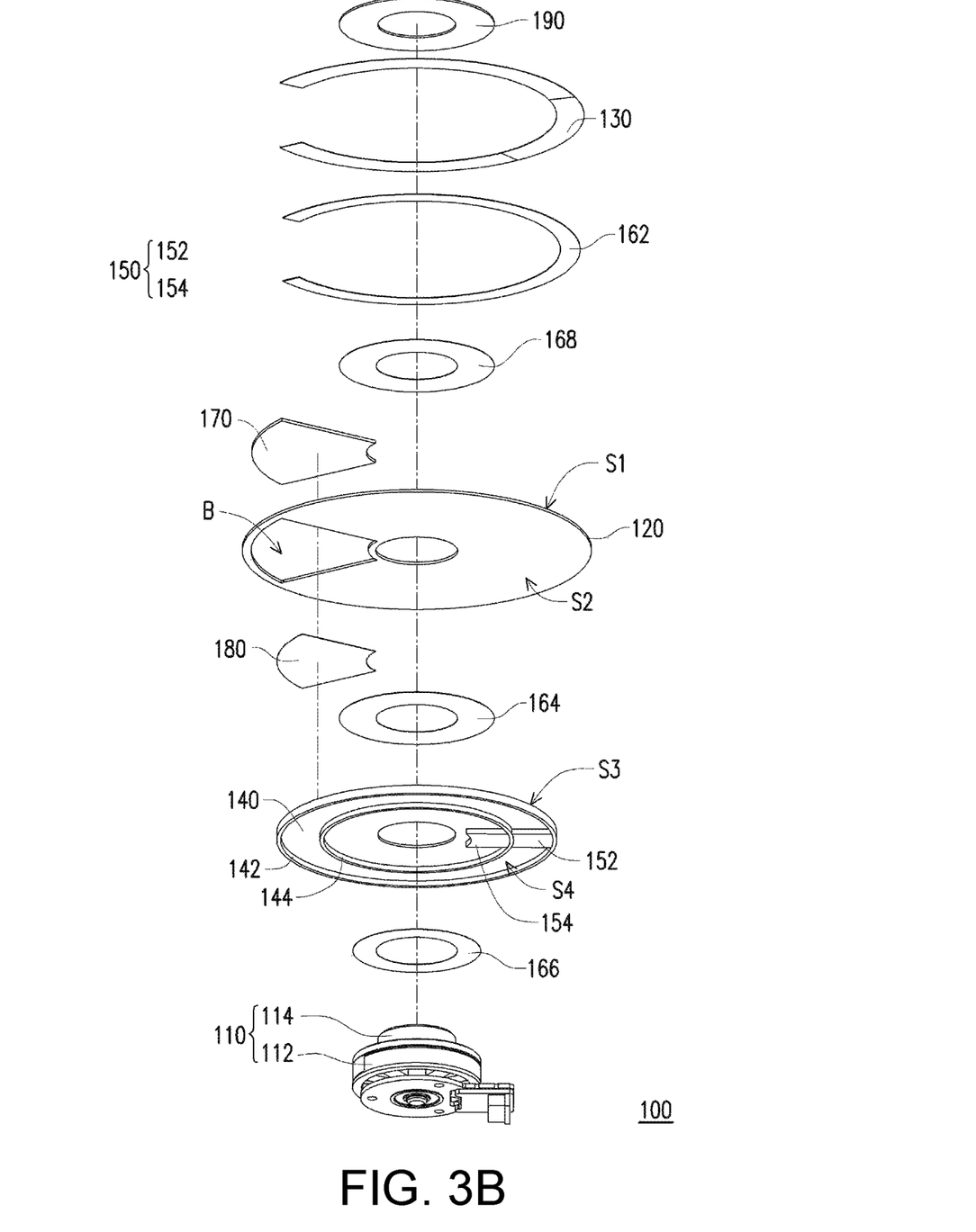
Figure 4:
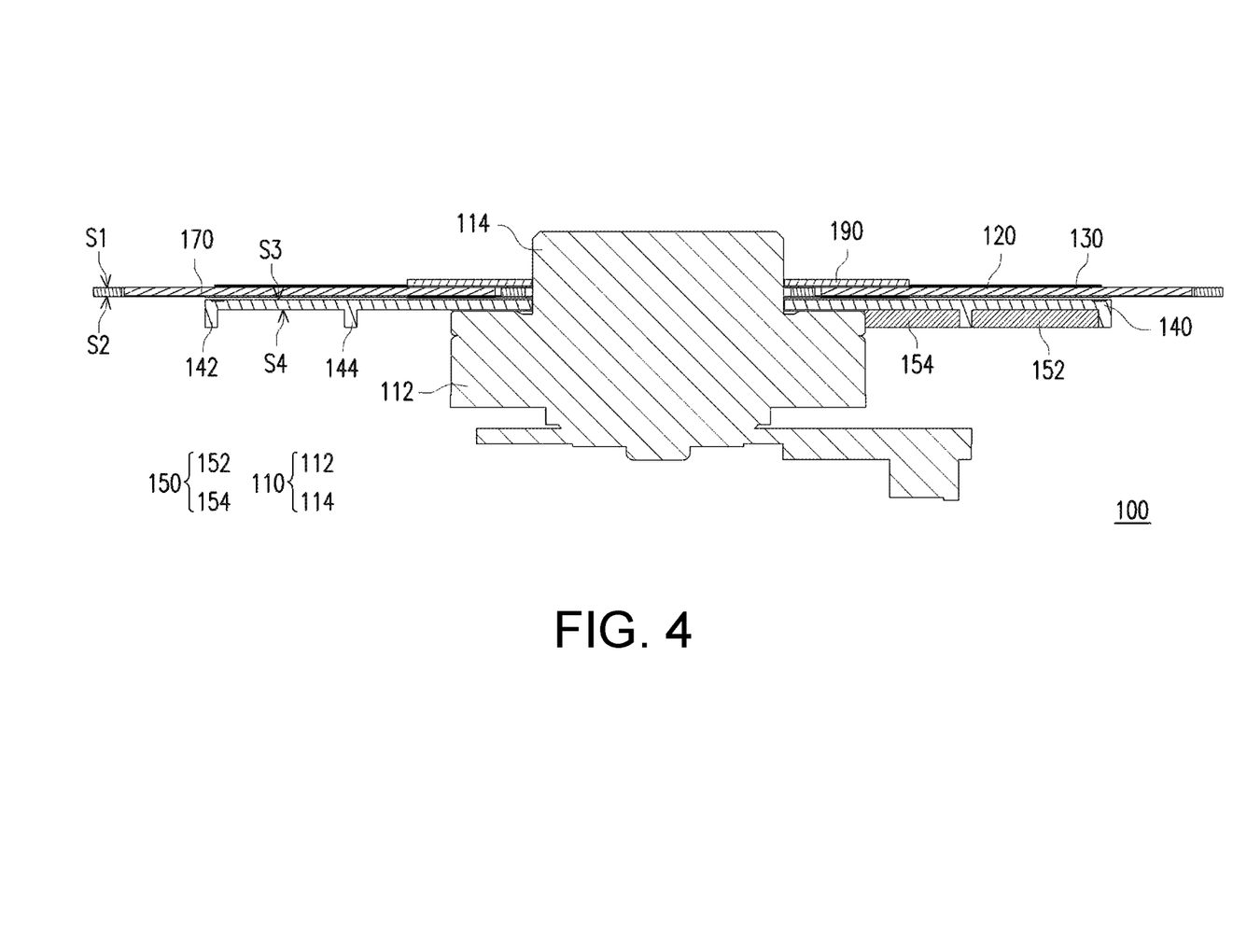
FIG. 4 is a schematic cross-sectional view of a rotation-type optical module taken along line A-A' of FIG. 2A.

FIG. 2A and FIG. 2B are each a schematic three-dimensional view of different perspectives of a rotation-type optical module according to an embodiment of the invention. FIG. 3A and FIG. 3B are each a schematic three-dimensional exploded view of a rotation-type optical module of FIG. 2A and FIG. 2B. FIG. 4 is a schematic cross-sectional view of a rotation-type optical module taken along line A-A' of FIG. 2A. Referring to FIG. 2A to FIG. 4, in the present embodiment, the illumination system 50 includes a rotation-type optical module 100 configured to be disposed on a light path in the illumination system 50, so that the passing light is excited or uniformity is improved. For example, the rotation-type optical module 100 is, for example, a rotation-type wavelength conversion apparatus or a rotation-type diffusion apparatus, and the invention is not limited thereto.

Referring to FIG. 2A and FIG. 2B, the rotation-type optical module 100 includes a driving element 110, a turntable 120, an optical material 130, a balancing ring 140, and a weight substance 150. The weight substance 150 may include a first weight substance 152 and a second weight substance 154. An outer diameter of the turntable 120 is greater than that of the balancing ring 140.

Referring to FIG. 3A and FIG. 3B, the driving element 110 includes a body 112 and a rotating shaft body 114 extending from the body 112. The body 112 is configured to drive the rotating shaft body 114 to rotate, and the rotating shaft body 114 is configured to rotate contacted components. The driving element 110 is, for example, a motor, but the invention does not limit a type of the motor.

The turntable 120 is sleeved on the rotating shaft body 114 of the driving element 110, and includes a first surface S1 and a second surface S2 opposite to each other. The turntable 120 is made of, for example, metal, a high-temperature resistant material, a material with high thermal conductivity, a material with good adhesive properties, or the like, or a combination of at least two of the foregoing materials, for example, an aluminum material. In the present embodiment, the turntable 120 is used to fix (for example, paste) the optical material 130 or inlay other optical elements. A shaft center of the turntable 120 includes an opening for the driving element 110 to pass from the rotating shaft body 114 that extends from the body 112.

The optical material 130 is disposed on the first surface S1 of the turntable 120, and is configured to receive an excitation beam. The optical material 130 is, for example, a wavelength conversion material, a reflection material, or a diffusion material, and is used to convert a wavelength of the beam, reflect the beam, or make the beam pass, to obtain a beam of a desired color or improve uniformity. In the present embodiment, the optical material 130 is a wavelength conversion material, such as a ceramic fluorescent sheet, a glass ceramic fluorescent sheet, an organic glue fluorescent sheet, or an inorganic glue fluorescent sheet, and the invention is not limited thereto. Specifically, the optical material 130 is disposed on the first surface S1 of the turntable 120 in a ring shape or a part of a ring shape, as shown in FIG. 2A.

Specifically, in the present embodiment, the rotation-type optical module 100 further includes a connecting layer 162, and the connecting layer 162 is connected between the optical material 130 and the turntable 120. The connecting layer 162 is used to adhere the optical material 130 to the first surface S1 of the turntable 120. In the present embodiment, the connecting layer 162 is made of a thermally conductive material configured to transfer heat generated by the optical material 130 to the turntable 120, so that the heat dissipation effect of the optical material 130 may be further improved. However, the connecting layer 162 may also be made of a non-thermally conductive material, and the invention is not limited thereto. The connecting layer 162 is, for example, silica gel or organic glue, but the invention is not limited thereto. In addition, in a preferred embodiment, the connecting layer 162 may also be made of a material having a function of scattering, reflection or diffusion, and the invention is not limited thereto.

In addition, in the present embodiment, the turntable 120 includes a notch B, and the rotation-type optical module 100 further includes an optical element 170 disposed in the notch B. The optical element 170 is configured to reflect the beam and provide a beam with an original wavelength. In the present embodiment, the optical element 170 may be transmissive or reflective, such as glass with an anti-reflection coating or glass with a reflective coating, or a highly reflective layer plated on the first surface S1 of the turntable 120, which is not limited in the invention. Specifically, if the optical element 170 is a transmissive anti-reflection coated glass, a maximum value of a radius of the balancing ring 140 needs to be determined according to a spot area on the optical element 170 (without shielding the spot), that is, the beam (for example, an excitation beam) of the original wavelength passes through the rotation-type optical module 100. If the optical element 170 is reflective coated glass configured to reflect the beam (for example, the excitation beam) of the original wavelength, the maximum value of the radius of the balancing ring 140 may be similar to that of the turntable 120.

In addition, in the present embodiment, the rotation-type optical module 100 further includes a connecting member 180 connected between the optical element 170 and the balancing ring 140. The connecting member 180 is, for example, silica gel or organic glue, but the invention is not limited thereto. In comparison to the conventional middle balancing ring 140 disposed on the turntable 120, in order to avoid excessive upward offset of the center of mass relative to the driving element 110, the radius of the conventional middle balancing ring 140 is made relatively small. In the present embodiment, an area of the connecting member 180 is less than that of the optical element 170 (for example, the connecting member 180 and the optical element 170 are both fan-shaped, and an equivalent radius of the optical element 170 is greater than that of the connecting member 180). Through this configuration, the configuration of the present embodiment may allow the optical element 170 to have a relatively large bonding area, thereby improving the stability of the optical element 170 during rotation.

The balancing ring 140 is disposed between the driving element 110 and the turntable 120 and includes a third surface S3 and a fourth surface S4 opposite to each other. The third surface S3 and the second surface S2 of the turntable 120 face each other, and the fourth surface S4 faces the driving element 110. In the present embodiment, the balancing ring 140 is made of, for example, metal, configured to increase the weight of the rotation-type optical module 100 or carry other configuration objects to adjust the center-of-mass position of the rotation-type optical module 100. For example, in the present embodiment, the balancing ring 140 is configured to carry a weight substance 150.

Specifically, in the present embodiment, the rotation-type optical module 100 further includes a connecting layer 164, and the connecting layer 164 is connected between the turntable 120 and the balancing ring 140. The connecting layer 164 is used to adhere the second surface S2 of the turntable 120 to the third surface S3 of the balancing ring 140. In the present embodiment, the connecting layer 164 is made of a thermally conductive material configured to transfer heat on the turntable 120 to the balancing ring 140, so that the heat dissipation effects of the turntable 120 and the optical material 130 disposed on the turntable 120 may be further improved. However, the connecting layer 164 may also be made of a non-thermally conductive material, and the invention is not limited thereto. The connecting layer 164 is, for example, silica gel or organic glue, but the invention is not limited thereto.

According to another aspect, in the present embodiment, the rotation-type optical module 100 further includes a connecting layer 166, and the connecting layer 166 is connected between the balancing ring 140 and the driving element 110. As shown in FIG. 3A, the connecting layer 166 is used to adhere the balancing ring 140 to the driving element 110, for example, a top surface (a surface that is of the body 112 and that is close to the balancing ring 140) of the body 112, and the balancing ring 140 is adhered to and abuts against the body 112 through the connecting layer 166. In the present embodiment, the connecting layer 166 is made of a non-thermally conductive material to insulate the heat transfer between the balancing ring 140 and the driving element 110, so that heat energy transferred to the driving element 110 may be further reduced, to maintain the working efficiency of the driving element 110. The connecting layer 166 is, for example, silica gel or organic glue, but the invention is not limited thereto.

The first weight substance 152 is disposed on the fourth surface S4 of the balancing ring 140. Specifically, in the present embodiment, the balancing ring 140 includes an outer retaining wall 142 and a first inner retaining wall 144 that protrude from the fourth surface S4, and the first weight substance 152 abuts between the outer retaining wall 142 and the first inner retaining wall 144. Therefore, when the rotation-type optical module 100 is rotated, the first weight substance 152 may be clamped via the outer retaining wall 142 and the first inner retaining wall 144 to fix a position of the first weight substance 152, to avoid a change in a position of a common center of mass (a center of mass) of the first weight substance 152 and the balancing ring 140. In one embodiment, the first weight substance 152 is adhered to the outer retaining wall 142, the first inner retaining wall 144, and the fourth surface S4 to fix the position.

Referring to FIG. 4, the rotation-type optical module 100 may be configured with a second weight substance 154 to further adjust the common center of mass, and the second weight substance 154 is adhered to the first inner retaining wall 144 and the fourth surface S4 to fix the position of the second weight substance 154. In other embodiments, the second weight substance 154 may be clamped via the first inner retaining wall 144 and a second inner retaining wall (not shown) to fix the position. A structure of the second inner retaining wall is similar to that of the first inner retaining wall 144, and the second inner retaining wall is disposed between the second weight substance 154 and the body 112. In one embodiment, the second weight substance 154 is adhered to the first inner retaining wall 144, a side wall of the body 112, and the fourth surface S4 to fix the position, which is not limited thereto. In one embodiment, the second weight substance 154 is adhered to the first inner retaining wall 144 and the fourth surface S4 to fix the position, and is not in contact with the side wall of the body 112.

It should be further noted that, in other embodiments, the balancing ring 140 may have a plurality of inner retaining walls protruding from the fourth surface S4, for example, including a first inner retaining wall 144, a second inner retaining wall (not shown), and a third inner retaining wall (not shown), and a second inner retaining wall is located between the first inner retaining wall 144 and the third inner retaining wall. A structure of the third inner retaining wall is similar to that of the first inner retaining wall 144. In addition, the weight substance 150 may further include a third weight substance (not shown), where the third weight substance abuts against and is fixed between the second inner retaining wall and the third inner retaining wall. In other words, the rotation-type optical module 100 may increase the quantity of retaining walls of the balancing ring 140 as required, to increase the quantity of configurable weight substances.

In this way, the balancing ring 140 is disposed below the turntable 120, which may avoid interference with an optical effect of the optical material 130 above the turntable 120. In addition, since the balancing ring 140 is disposed below the turntable 120, the operability of adjusting the load may be improved. Furthermore, the balancing ring 140 is disposed below the turntable 120, to avoid an excessively high overall center-of-mass position of the rotation-type optical module 100, thereby improving the stability of the rotation-type optical module 100 during rotation. In other words, the foregoing configuration may effectively lower the center-of-mass position of the rotation-type optical module 100, to avoid deformation of the turntable as a result of an unstable structure, and reduce the vibration phenomenon generated during rotation.

In addition, in the present embodiment, the rotation-type optical module 100 may further include another balancing ring 190 and another connecting layer 168, and the balancing ring 190 is connected and disposed on the first surface S1 of the turntable 120 through the connecting layer 168. In the present embodiment, a size of the balancing ring 190 is less than that of the balancing ring 140. Therefore, structural stability of the rotation-type optical module 100 may further be improved.

In addition, the turntable 120 further includes an optical element 170, and the balancing ring 190 and the balancing ring 140 clamp the optical element 170 together to strengthen the stability of the optical element 170.

Figure 5:
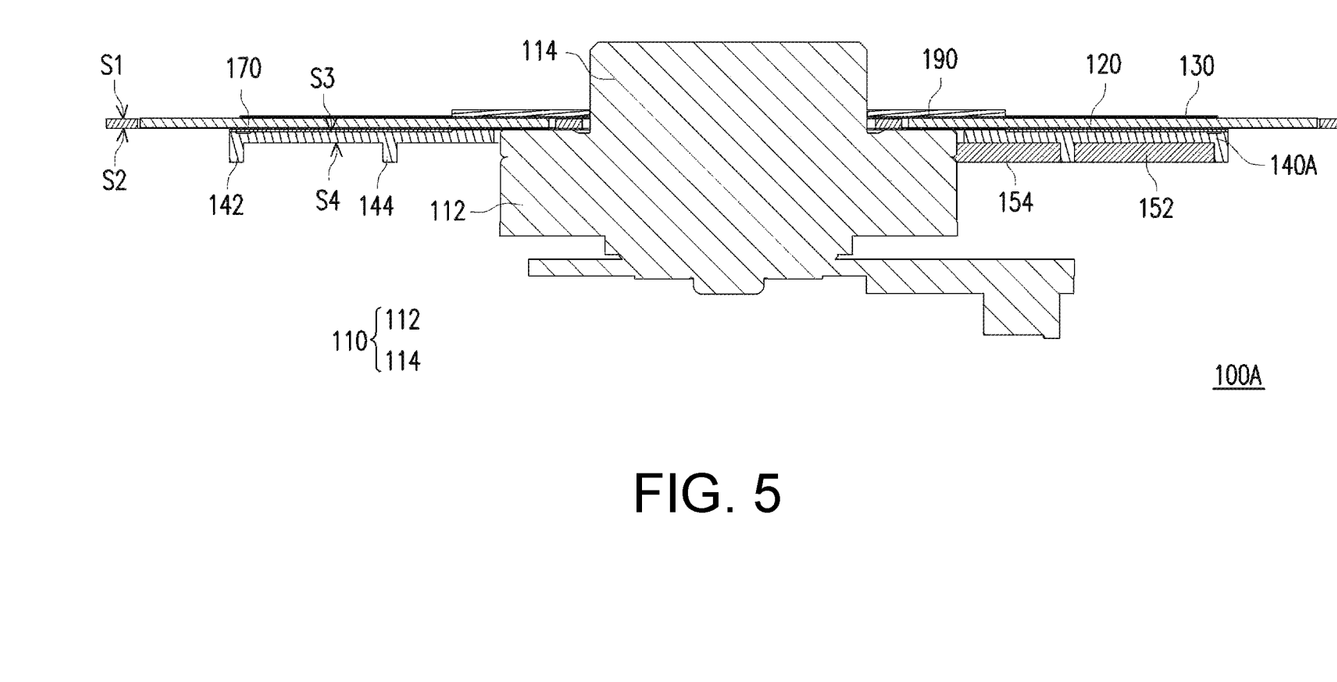
FIG. 5 is a schematic cross-sectional view of a rotation-type optical module taken along line A-A' of a rotation-type optical module of FIG. 2A according to another embodiment.

FIG. 5 is a schematic cross-sectional view of a rotation-type optical module taken along line A-A' of a rotation-type optical module of FIG. 2A according to another embodiment. Referring to FIG. 5, the rotation-type optical module 100A of the present embodiment is similar to the rotation-type optical module 100 shown in FIG. 2A. A difference between the two is that in the present embodiment, a balancing ring 140A is sleeved on a body 112 of a driving element 110. In other words, in the present embodiment, a connecting layer between the balancing ring 140A and the driving element 110 may be omitted. In addition, since the balancing ring 140A is sleeved on the body 112 of the driving element 110, an overall center-of-mass position of the rotation-type optical module 100 may further be lowered, to improve center-of-mass adjustability of the rotation-type optical module 100. In the present embodiment, the third surface S3 of the balancing ring 140A is on a same plane as a top surface of the body 112 of the driving element 110, but the invention is not limited thereto. The top surface of the body 112 is an annular plane surrounding a rotating shaft body 114, as shown in FIG. 5.

Based on the above, in the rotation-type optical module and the projection apparatus of the invention, the balancing ring of the rotation-type optical module is disposed below the turntable, which may avoid interference with the optical effect of the optical material above the turntable. In addition, since the balancing ring is disposed below the turntable, the operability of adjusting the load may be improved. Furthermore, the balancing ring is disposed below the turntable to avoid an excessively high overall center-of-mass position of the rotation-type optical module, thereby improving the stability of the rotation-type optical module during rotation. In other words, the foregoing configuration may effectively lower a center-of-mass position of the rotation-type optical module to avoid deformation of the turntable as a result of an unstable structure, and reduce the vibration phenomenon generated during rotation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A rotation-type optical module comprising a driving element, a turntable, an optical material, a balancing ring, and a first weight substance, wherein
the driving element comprises a body and a rotating shaft body extending from the body,
the turntable is sleeved on the rotating shaft body and comprises a first surface and a second surface opposite to each other,
the optical material is disposed on the first surface of the turntable,
the balancing ring is disposed between the driving element and the turntable and comprises a third surface and a fourth surface opposite to each other, wherein the third surface and the second surface face each other, and
the first weight substance is disposed on the fourth surface of the balancing ring, wherein the balancing ring comprises an outer retaining wall and at least one inner retaining wall which protrude from the fourth surface, and the first weight substance abuts between the outer retaining wall and the at least one inner retaining wall, wherein a distance, from an axis of the driving element to one of the outer retaining wall, the at least one inner retaining wall and the first weight substance, is longer than a radius of the body of the driving element.

2. The rotation-type optical module according to claim 1, further comprising at least one connecting layer, wherein the at least one connecting layer is connected at at least one of the following positions: between the optical material and the turntable, between the turntable and the balancing ring, and between the balancing ring and the driving element.

3. The rotation-type optical module according to claim 2, wherein a material of the at least one connecting layer connected between the optical material and the turntable or between the turntable and the balancing ring is a thermally conductive material.

4. The rotation-type optical module according to claim 2, wherein a material of the at least one connecting layer connected between the balancing ring and the driving element is a non-thermally conductive material.

5. The rotation-type optical module according to claim 1, wherein the turntable comprises a notch, and the rotation-type optical module further comprises an optical element configured in the notch, wherein the optical element is transmissive or reflective.

6. The rotation-type optical module according to claim 5, further comprising a connecting member connected between the optical element and the balancing ring.

7. The rotation-type optical module according to claim 1, wherein the at least one inner retaining wall comprises a first inner retaining wall, the rotation-type optical module further comprises a second weight substance disposed on the fourth surface of the balancing ring, and the second weight substance abuts against the first inner retaining wall and is attached to the fourth surface of the balancing ring.

8. The rotation-type optical module according to claim 1, wherein the optical material is a wavelength conversion material or a diffusion material.

9. The rotation-type optical module according to claim 1, wherein the balancing ring is sleeved on the body of the driving element.

10. A projection apparatus, comprising an illumination system, at least one light valve, and a projection lens, wherein
the illumination system is configured to provide an illumination beam and comprises a rotation-type optical module, and the rotation-type optical module comprises a driving element, a turntable, an optical material, a balancing ring, and a first weight substance, wherein
the driving element comprises a body and a rotating shaft body extending from the body,
the turntable is sleeved on the rotating shaft body and comprises a first surface and a second surface opposite to each other, the optical material is disposed on the first surface of the turntable, the balancing ring is disposed between the driving element and the turntable and comprises a third surface and a fourth surface opposite to each other, wherein the third surface and the second surface face each other, and the first weight substance is disposed on the fourth surface of the balancing ring, the at least one light valve is disposed on a transmission path of the illumination beam and is configured to convert the illumination beam into an image beam, and the projection lens is disposed on a transmission path of the image beam and is configured to project the image beam out of the projection apparatus, wherein the balancing ring comprises an outer retaining wall and at least one inner retaining wall which protrude from the fourth surface, and the first weight substance abuts between the outer retaining wall and the at least one inner retaining wall, wherein a distance, from an axis of the driving element to one of the outer retaining wall, the at least one inner retaining wall and the first weight substance, is longer than a radius of the body of the driving element.

11. The projection apparatus according to claim 10, wherein the rotation-type optical module further comprises at least one connecting layer, and the at least one connecting layer is connected at at least one of the following positions: between the optical material and the turntable, between the turntable and the balancing ring, and between the balancing ring and the driving element.

12. The projection apparatus according to claim 11, wherein a material of the at least one connecting layer connected between the optical material and the turntable or between the turntable and the balancing ring is a thermally conductive material.

13. The projection apparatus according to claim 11, wherein a material of the at least one connecting layer connected between the balancing ring and the driving element is a non-thermally conductive material.

14. The projection apparatus according to claim 10, wherein the turntable comprises a notch, and the rotation-type optical module further comprises an optical element configured in the notch, wherein the optical element is transmissive or reflective.

15. The projection apparatus according to claim 14, wherein the rotation-type optical module further comprises a connecting member connected between the optical element and the balancing ring.

16. The projection apparatus according to claim 10, wherein the at least one inner retaining wall comprises a first inner retaining wall, the rotation-type optical module further comprises a second weight substance disposed on the fourth surface of the balancing ring, and the second weight substance abuts against the first inner retaining wall and is attached to the fourth surface of the balancing ring.

17. The projection apparatus according to claim 10, wherein the optical material is a wavelength conversion material or a diffusion material.

18. The projection apparatus according to claim 10, wherein the balancing ring is sleeved on the body of the driving element.

* * * * *